United States Patent [19]

Vollrath

[11] Patent Number: 4,636,921
[45] Date of Patent: Jan. 13, 1987

[54] DEVICE FOR MOUNTING A LIGHT UNIT ON AN AUTOMOBILE BODY

[75] Inventor: Johannes Vollrath, Neckarsulm, Fed. Rep. of Germany

[73] Assignee: Audi AG, Ingolstadt, Fed. Rep. of Germany

[21] Appl. No.: 731,964

[22] Filed: May 8, 1985

[30] Foreign Application Priority Data

May 9, 1984 [DE] Fed. Rep. of Germany ....... 3417041

[51] Int. Cl.⁴ ............................................. B60Q 1/00
[52] U.S. Cl. ....................................... 362/61; 362/382
[58] Field of Search ................... 362/61, 80, 306, 308, 362/310, 369, 370, 390, 457, 368, 382

[56] References Cited

U.S. PATENT DOCUMENTS

| | | | |
|---|---|---|---|
| 3,065,340 | 11/1962 | Mead et al. | 362/369 |
| 4,198,674 | 4/1980 | Ilhage et al. | 362/80 |
| 4,249,232 | 2/1981 | Dick | 362/61 |
| 4,482,690 | 11/1984 | Orphanides | 528/83 |

Primary Examiner—Ira S. Lazarus
Assistant Examiner—David A. Okonsky
Attorney, Agent, or Firm—Kane, Dalsimer, Kane, Sullivan and Kurucz

[57] ABSTRACT

A device mounting an automobile body to a light unit which is provided with a housing connected either directly or by a support frame to the automobile body. The combination of undercut hollow spaces and anchoring protrusions extending into these spaces which are then filled with a hardened flexible plastic material to anchor the protrusions in the spaces.

7 Claims, 5 Drawing Figures

DEVICE FOR MOUNTING A LIGHT UNIT ON AN AUTOMOBILE BODY

BACKGROUND OF THE INVENTION

The invention relates to a device for mounting a light unit on an automobile body. The housing of the light unit is either connected directly to the automobile body or by means of a support frame. The term "automobile body" as used herein is intended to encompass automobile body parts such as front or rear parts on which the light unit is to be mounted and which in turn is mounted on the automobile body. These automobile body parts may be of sheet metal, but the current trend is to make then in increasing numbers from plastic materials (for example "Soft-Nose"), so as to survive light accidents without permanent deformation.

Therefore, the mounting of head lamps on the automobile body was performed exclusively by means of screws with washers and nuts, as well as by means of spring yokes. In this fashion, a flexible mounting of the head lamp within defined limits is obtained, and, in particular, for dampening road shocks, which considerably shorten the life of the incandescent lamps. This type of mounting is relatively expensive, and, above all, the mounting cannot be performed fully automatically. The screws, washers and nuts are loose parts and accordingly there is considerable wastage and loss of such parts during the mounting procedure. Moreover, the ever present danger exists that wrong screws are used accidentally in view of the large number of different screws which are available and which are being used during the assembly of the motor vehicle. Needless to say, wrong screws may not be suitable for a safe mounting of the headlamps. In order to prevent these disadvantages, it has been proposed in DE-OS-No. 30 30 427 to mount a light device on the front part of the vehicle by means of a locking connection. However, in practice this proposal is not practical, since tolerances of a few mm occur during the automobile body assembly, which cannot be accommodated by such a locking connection. Moreover, the various deformations occuring in the automobile body during operation make such a locking connection problematic. Finally, a flexible mounting with such a connection is difficult to adjust.

SUMMARY OF THE INVENTION

It is therefore an object of the invention to provide a device for mounting a light unit on a motor vehicle body, which mounting can be fully automated, does not require any loose parts, such as screws, nuts and washers, is cost effective, enables and causes a large tolerance compensation in each direction, and dampens road shocks transmitted to the light device without creating so-called "dancing" light.

During the assembly of the light unit, the housing or support frame is aligned and fixed in position by customary means, whereby means having anchoring protrusions are mounted on one part to extend into undercut hollow spaces of the other part. Thereafter, plastic is automatically injected into the hollow spaces by means of customary injection molding guns. The plastic material possesses certain but variable flexibility after hardening. A foam plastic has been shown to be particularly advantageous as for example, plastic for foaming in window frames. Since a relatively large distance may exist between the wall of the hollow space and the anchoring protrusion, in practice finishing tolerances which may be as much as 10 mm in automobile bodies can be easily compensated. In the case of repair, this connection can be removed in a simple manner by melting the plastic with a thermo probe.

The hollow spaces are preferably cup-shaped recesses. The inner peripheral wall defining the spaces include radially inwardly extending protrusions, preferably in the form of radially inwardly extending ribs. Alternatively, the hollow spaces may also have a trapezoidal cross-section.

The anchoring protrusions are preferably cup-shaped and their bottoms have a central opening. This form of protrusion is relatively simply formed from sheet metal by a stamping operation. Naturally, these protrusions may also be made separately stamped sheet metal parts which may then be welded on the corresponding locations of the automobile body.

BRIEF DESCRIPTION OF THE FIGURES

Exemplified embodiments of the invention are described in the following in conjunction with the drawings in which.

DETAILED DESCRIPTION

Figure 1:
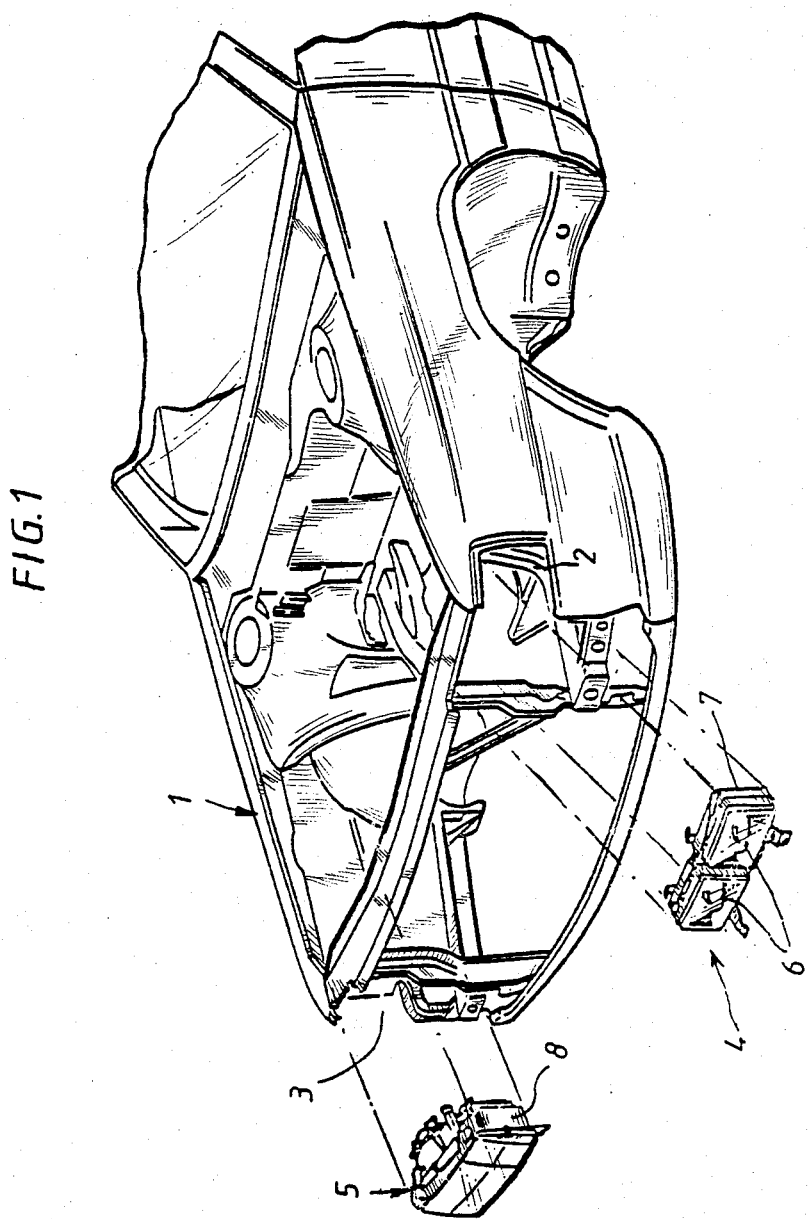
FIG. 1 is an exploded fragmentary front perspective view of a motor vehicle body with two light units partially pulled apart illustrating the right light unit being shaped as a support frame double head lamp and the left light unit as a housing head lamp.

The front structure of a motor vehicle automobile body 1 is illustrated in FIG. 1 and includes cutouts or recesses 2 and 3 for receiving in each a light unit. The right light unit 4 of FIG. 1 is shown as a support frame double head lamp and the left light unit 5 is shown as a housing head lamp. The light unit 4 is provided with two built-in head lamps 6 which is adjustably mounted in a support frame 7 which is mounted in the cutout 2 on the automobile body 1. The reflector together with the incandescent bulb is adjustably mounted in a housing 8 of light unit 5, which in turn is mounted in cut out 3 on the automobile body 1.

Figure 2:
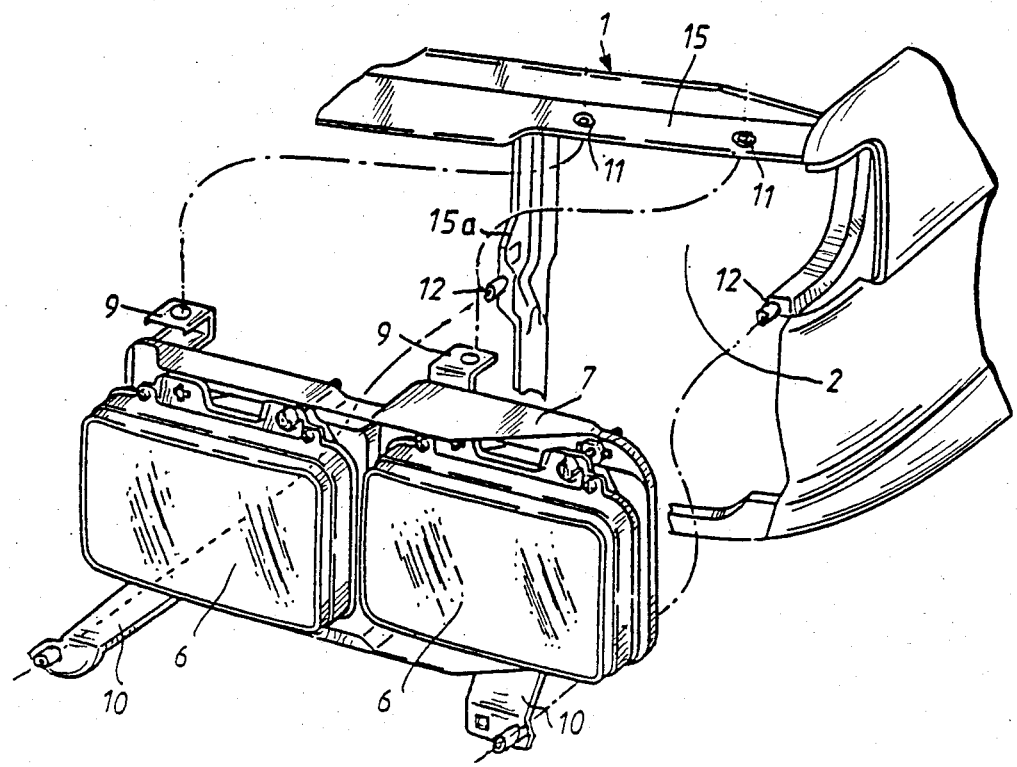
FIG. 2 is an enlarged exploded fragmentary front perspective view of the support frame double head lamp of FIG. 1 and the adjacent part of the front structure of the automobile body.

The arrangement and the installation of the support frame double head lamp 4 in the automobile cutout 2 is illustrated on an enlarged scale in FIG. 2. The support frame 7 is provided with upper extensions 9 and lower extension 10 to facilitate mounting the frame 7 in recess 2 of the automobile body 1. The mounting location on the automobile body for extension 9 are designated with the reference numeral 11 and the mounting location for extensions 10 are designated with the reference numeral 12.

Figure 3:
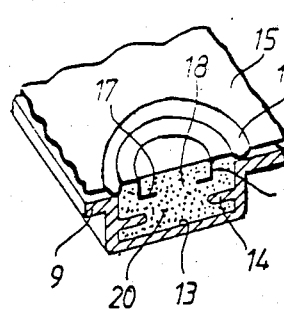
FIG. 3 is a fragmentary perspective view partly in section of a mounting location between the head lamp housing or support frames and the automobile body in accordnace with a first exemplified embodiment.
Figure 4:
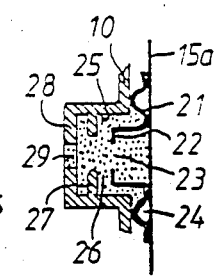
FIG. 4 is a cross-sectional view illustrating the mounting of the head lamp unit shown in FIG. 2.
Figure 5:
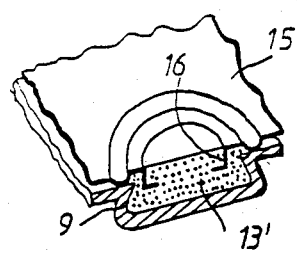
FIG. 5 is a fragmentary perspective view partly in section similar to FIG. 3 but showing the embodiment of FIG. 4.

In contrast to the customary mounting of the light units on the automobile body by means of screw and nuts, the connection of this invention deploys a flexible, hardenable plastic-liked polyurethane foam. Exemplified embodiments of these connections are illustrated in FIGS. 3 to 5. The mounting of the extensions 9 on the locations 11 of the automobile body 1 may be accomplished, for example, in the manner illustrated in FIG. 3. As will be seen, the extension 9 is provided with a hollow space 13 of circular cross-section. The inner peripheral wall of the space 13 includes a radially inwardly extending rib 14, so that an undercut hollow space is defined. A cup-shaped protrusion 16 is stamped out of the automobile body sheet metal 15 at the locations 11 in FIG. 2. The bottom of the protrusion 16 has a central opening 18 extending into the hollow space 13. The protrusion 16 is encompassed by an annular shoulder 19 which is engaged by the upper side of extension 9. The hollow space 13 and the inner space of the protrusion 16 are filled with a hardenable flexible plastic 20, for example, polyurethane foam, so that the protrusion 16 is embedded in the plastic. Thus, a positive but flexible connection is provided between the extension 9 and the automobile body sheet metal 15 by the undercuts which are formed by the rib 14, on the one hand, and by the flange 17 of protrusion 16 on the other hand.

The mounting of the extensions 10 of support frame 7 on the locations 12 of the automobile body may be performed in a manner illustrated in FIG. 4. The principal of mounting is the same as in FIG. 3, with the only difference being that a cup-shaped element 21 is welded on the automobile body sheet metal 15a. The cup-shaped element 21 includes a bottom flange 22 having a central opening 23 and which is also provided with an annular shoulder 24 the rear side of which engages the extension 10. The extension 10 is provided with a hollow space 25 (similar to exemplified embodiment of FIG. 3) into which a rib 27 extends and whose bottom 28 has an opening 29. The hollow space 25 and also the inner space of the cup-shaped element 21 is filled with hardenable flexible plastic 26 which forms a positive but flexible connection between the extension 10 and the sheet metal 15a of the automobile body in view of the undercuts formed by the rib 27 in hollow space 25 and the bottom flange 22 of the cup-shaped element 21.

During the assembly of the light unit 4, it is initially positioned by means of an assembly gauge in undercut 2 of the automobile body 1. The cup-shaped protrusions 16 are located in the hollow spaces 13 and the cup-shaped elements 21 in the hollow spaces 25. Thereafter, plastic is injected by means of an injection gun through the protrusions 16 and the openings 18 into the hollow spaces 13, on the one hand, and through the openings 29 into the hollow spaces 25 and through the openings 23 into the inner spaces of the cup-shaped elements 21, on the other hand, until the spaces and recesses are filled completely with plastic, as can be seen from FIGS. 3 and 4. After the hardening of the plastic, the support frame 7 is fixedly connected with the head lamps 6, but is fixedly connected with the automobile body.

The exemplified embodiment in accordance with FIG. 5 corresponds substantially to the exemplified embodiment in accordance with FIG. 3 with the difference that the hollow space 13' has a trapezoidal cross-section.

In the illustrated exemplified embodiments the support frame 7 is made of plastic and the automobile body is made from sheet metal. However, both parts may be made from the same material or the automobile body may be made from plastic and the support frame from sheet metal.

The mounting of the light unit 5, which is shown as a housing head lamp in the undercut 3 of the front part of the automobile body, can be performed in the same manner as described in conjunction with the mounting of the light unit 4. In this regard, the head lamp housing 8 is provided with undercut hollow spaces 13 or 25 into which the cup-shaped protrusions 16 or 21 extend. Which of the embodiments of FIGS. 3 and 4 is used for any application depends on the accessibility for deployment of the injection guns. It is important that the cross-sections of the hollow spaces and the protrusions extending therein are so designed that a positive connection is made between the parts by the injected and hardened plastic.

Naturally many modifications of the illustrated exemplified embodiments are feasible without departing from the spirit of the invention.

What is claimed is:

1. A method of mounting a light unit on an automobile body, said light unit having a housing connected to the automobile body, comprising the steps of:
   a. providing the housing with undercut hollow spaces;
   b. providing the automobile body with means having anchoring protrusions;
   c. joining the housing and the automobile body with the anchoring protrusions extending into the hollow spaces; and
   d. filling said hollow spaces with a hardenable flexible plastic material so that the anchoring protrusions are embedded therein.

2. The method in accordance with claim 1, wherein a radially inwardly extending protrusion is provided on the inner peripheral wall of hollow spaces.

3. The method in accordance with claim 1, wherein said hollow spaces have a trapezoidal cross-section.

4. The method of claim 1 wherein said housing is attached to a support frame, said undercut hollow spaces being provided in the support frame.

5. The method of claim 1 wherein said means comprises a support frame, said anchoring protrusions being provided on said support frame.

6. The method in accordance with claim 1, wherein said anchoring protrusions are cup-shaped and the bottoms thereof are provided with a central opening.

7. The method in accordance with claim 6, wherein one of said housing and the automobile body is made from plastic and the other is made from sheet metal, said hollow spaces being disposed in the plastic part and the cup-like protrusions are pushed out of the sheet metal part.

* * * * *